June 4, 1968 A. D'ONOFRIO 3,386,551
METHOD OF AND APPARATUS FOR USING RADIO OR HIGH
FREQUENCY ENERGY TO PRODUCE PRINTED MATTER
Original Filed April 14, 1965 4 Sheets-Sheet 1

INVENTOR
ANTHONY D'ONOFRIO
BY Thomas S. Ross
Joseph R. Spalla
ATTORNEYS

INVENTOR
ANTHONY D'ONOFRIO
BY Thomas S. Ross
Joseph R. Spalla
ATTORNEYS

June 4, 1968 A. D'ONOFRIO 3,386,551

METHOD OF AND APPARATUS FOR USING RADIO OR HIGH FREQUENCY ENERGY TO PRODUCE PRINTED MATTER

Original Filed April 14, 1965 4 Sheets-Sheet 3

INVENTOR
ANTHONY D'ONOFRIO
BY Thomas S. Ross
Joseph R. Spalla
ATTORNEYS

June 4, 1968 A. D'ONOFRIO 3,386,551

METHOD OF AND APPARATUS FOR USING RADIO OR HIGH FREQUENCY ENERGY TO PRODUCE PRINTED MATTER

Original Filed April 14, 1965 4 Sheets-Sheet 4

INVENTOR
ANTHONY D'ONOFRIO
BY Thomas S. Ross
Joseph R. Spalla
ATTORNEYS

United States Patent Office 3,386,551

Patented June 4, 1968

3,386,551

METHOD OF AND APPARATUS FOR USING RADIO OR HIGH FREQUENCY ENERGY TO PRODUCE PRINTED MATTER

Anthony D'Onofrio, West Hartford, Conn., assignor to Litton Business Systems, Inc., a corporation of New York Continuation of application Ser. No. 448,051, Apr. 14, 1965. This application Nov. 14, 1966, Ser. No. 594,263

17 Claims. (Cl. 197—1)

ABSTRACT OF THE DISCLOSURE

A method and apparatus for recording printed matter in polar dielectric sheet material by directing high frequency alternating electric fields set up between electrodes through the sheet material to dielectrically heat the material. Character patterns define preferential paths for the electric field through discrete cross sections of the sheet material whose area configuration in the plane of the sheet material is that of a selected character pattern to provide a potential gradient across the discrete cross sections which will dielectrically heat the discrete cross sections to recording temperature in a predetermined time.

This application is a continuation of Ser. No. 448,051 filed Apr. 14, 1965, now abandoned.

This invention is a method of and apparatus for using radio or high frequency energy to produce printed matter; more particularly it is a method of forming printed matter through the agency of heat generated by subjecting polar dielectric record material to a high frequency electric field pattern; and specifically it is a method for visibly marking high loss polar dielectric record material or visibly changing heat sensitive coatings thereon in accordance with an electric field character pattern set up between conductive plates in series with a high voltage high frequency source.

Prior to the present invention the composition of original printed documents resulting from operation of printing instrumentalities, whether selectively actuated from a keyboard or from translatable record tapes or the like, has involved the movement of masses to mechanically press or transfer a physical marking medium onto paper or to impress a mark on pressure sensitive paper. Conventional typewriters and printers of various kinds or types are exemplary of machines employing pressure or impact forces to transfer marking material.

Other printing processes of the non-mechanical type e.g. thermography and facsimile which utilize heat or electrical energy to mark special material are known. These processes, while capable of copying an original source document, are not suitable for use in composing an original source document and are incapable of producing multicopies simultaneously.

In accordance with the present invention polar dielectric materials e.g. paper products, are placed between conductive plates in series with a high voltage high frequency source. A dielectric character pattern secured to one of the plates, a conductive character pattern conductively connected to one of the plates, or either type of character pattern capacitively coupled to one of said plates may be employed. The high frequency field between the plates, as directed by the character pattern is operative on the order of milliseconds to internally agitate the molecules of the paper dielectric material between the character pattern and opposite plate to cause internal heating in accordance with the character pattern. The heat generated may be such as to locally burn the pattern in ordinary paper or to locally visibly change a heat sensitive coating on the paper.

The features of the present invention are many; the elimination of noise; and the necessity for ribbon or ink supplies being at once apparent. A further and salient feature of the invention is the capability to produce multiple copies simultantously and all of the same quality.

Accordingly, a broad object of the invention is in the provision of a new and novel method of recording character patterns through the agency of heat generated in dielectric record material by radio frequency energy.

Another object of the invention is in the provision of a method for producing original source documents through the employment of heat generated by radio frequency electric field patterns defining characters.

Another object of the invention is to provide a method of composing original source documents and multiple copies thereof simultaneously and all of the same quality through the employment of heat generated by radio frequency electric field patterns defining characters.

Still another object of the invention is to provide a method for visibly changing polar dielectric materials and thus recording character patterns through the agency of heat generated internally thereof as a result of applied high frequency electric field patterns.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

The phenomena known as dielectric heating is well known. This phenomena is believed due to the movement of the molecules of a polar dielectric material in orienting themselves to an applied electric field alternating on the order of tens of millions of cycles per second. The molecules follow the reversals in polarity of the electric field but, being imperfectly elastic, heating due to molecular friction or dielectric hysteresis results.

Insofar as is presently known the principle of dielectric heating has not heretofore been employed to visibly mark or produce printed matter in dielectric material. By dielectric material it is meant a polar dielectric material characterized by a dielectric constant and a dissipation factor such that the heat generated within the material at the frequency and voltage employed, is sufficient to visibly change the material itself or to visibly change a heat sensitive coating on the material.

The dissipation factor of a polar dielectric material, which varies with frequency, is a measure of the inelasticity of the material and is a maximum over a given frequency range at a given temperature. The dissipation factor is defined as the ratio of energy dissipated to the energy stored in a dielectric material or as the tangent of the loss angle, which is the angle by which the current fails to lead the voltage by 90°. Where the loss angle is small (less than .1) the dissipation factor may be considered equivalent to the power factor or cosine of the phase angle of the material.

In accordance with an embodiment of the invention dielectric record material is placed between conductive plates comprising the printing point of a machine. One of the plates defines the character pattern to be marked. Upon application of an alternating electric field of predetermined voltage and frequency across the plates, the temperature of the material between the character plate and opposite plate will rise on the order of milliseconds; and in the case of ordinary paper the generated heat will visibly change its structure or where the material has a heat sensitive coating the generated heat will visibly change the coating.

Figure 1:
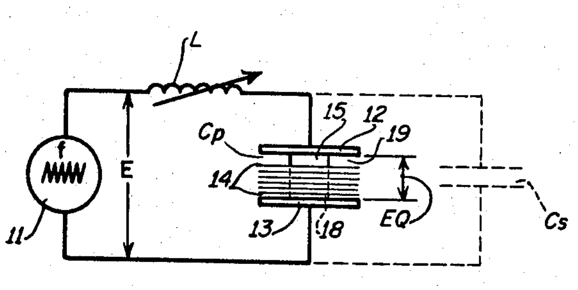
FIGURE 1 is a schematic view illustrative of the principal elements of one embodiment of the invention.

Referring now to the drawings wherein like or corresponding elements are designated by like reference numerals and wherein an exemplary machine embodiment of the invention is illustrated, there is shown in FIGURE 1 a normally quiescent high frequency oscillator 11 whose output voltage E is preferably connected in a load circuit comprising a series inductance L and a printing point capacitor $C_p$ defined by conductive plates 12 and 13 between which is disposed polar dielectric material 14 to be heated and visibly marked. The load circuit is also characterized by the stray capacitance of the leads and elements represented by a capacitor $C_s$, the latter being much larger than the printing point capacitance. Where the stray capacitance is not sufficiently large an actual capacitance may be employed. As will hereinafter appear the oscillator is adapted to be pulsed whereby the alternating electric field across plates 12 and 13 during the pulse interval will produce sufficient heat within the dielectric material to effect marking or printing. In the description to follow, plate 12 will hereinafter be referred to as the character plate, and plate 13 as the viewing or common plate.

Figure 2:
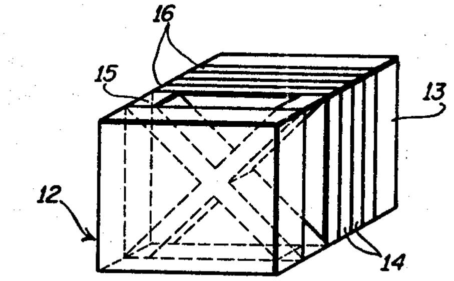
FIGURE 2 is an exaggerated perspective view of the FIGURE 1 printing station showing character and viewing plates, character pattern and material for recording the character pattern.

As most clearly seen in FIGURE 2 a character pattern 15 (illustrated as an "X") is associated with character plate 12. The character pattern 15 is preferably made from conductive material though dielectric material will also serve. In accordance with the invention the dielectric sheet material 14 to be marked may be ordinary paper or paper having a heat sensitive coating. When the character pattern is conductive the sheets to be marked may be ordinary paper or paper having a heat sensitive coating. When the character pattern is conductive the sheets to be marked are preferably placed between heat insulating dielectric material 16, e.g. polyvinyl acetate, which has a slightly higher loss factor (dissipation factor times dielectric constant) and accordingly heats to a temperature higher than experienced by the material to be marked. The purpose of the heat insulating material 16 is to isolate the polar dielectric material from the metal character pattern 15 and from the conductive view plate 13 which would act as heat sinks drawing off heat from the polar dielectric material to be marked with the result that the outer sheets 14 of a multiple sheet pack would not experience the same temperature rise as the middle sheets. Accordingly the heat insulating material 16 serves to satisfy the thermal boundaries to permit uniform heating of the dielectric sheets 14 to be marked. When the character pattern 15 is a dielectric material it may itself serve as the heat barrier between the character plate and the paper sheets 15. The viewing plate is preferably glass having a conductive coating on the side facing the character plate. Such conductive glass is marketed and known as Nesa glass.

By polar dielectric material is meant ordinary polar and polar products, paper commercially known as thermographic copy paper which is a paper sheet coated with a heat sensitive coating of the type which chemically changes or transparentizes in response to heat, or sheets other than paper having a heat sensitive coating which consists of color reactive materials in a polar dielectric binder.

The energy or work in B.t.u. required to raise the temperature of a material is in accordance with the following:

(1) $$\text{Work required} = WS\Delta T = (\lambda Ad)S\Delta T$$

Where $W$=weight (pounds of the volume of dielectric material between the character and viewing plate i.e. the character pattern area A times the thickness $d$ and density $\lambda$ of the material). The design character pattern area is preferably chosen to correspond to the largest character pattern area or greater.

$S$=specific heat of the material.

$\Delta T$=temperature increase to required marking temperature.

Since (2) Work=Power (B.t.u./sec.)×time, the power dissipated in the dielectric sheet material between character plate and viewing plate multiplied by the time interval in which the work is to be effected must equal the work required.

The power dissipated (watts) in the dielectric material of a capacitor takes the form of the following equation:

(3) $$P_d = E_c^2 \omega C_p d_f$$

and in terms of capacitance parameters (4) $$P_d = E_c^2 \omega \frac{Aed_f}{d}$$

watts or since 1 watt=1054.8 B.t.u./sec.

$$P_d = \frac{E_c^2 \omega \frac{Aed_f}{d}}{1054.8} \text{B.t.u./sec.}$$

where $E_c$ is the voltage across the capacitor plates, $\omega$ is $2\pi$ times the frequency, $C_p$ is the capacity between plates, $d_f$ is the dissipation factor of the material at or near its maximum at the frequency employed, $d$ is the dielectric thickness, and $e$ is the dielectric constant of the material.

Substituting the work required and power dissipated given by Equations 1 and 5 in Equation 2 gives:

(6) $$1054.8\lambda AdS\Delta T = E_c^2 \omega \frac{Aed_f t}{d}$$

Figures 3, 4:
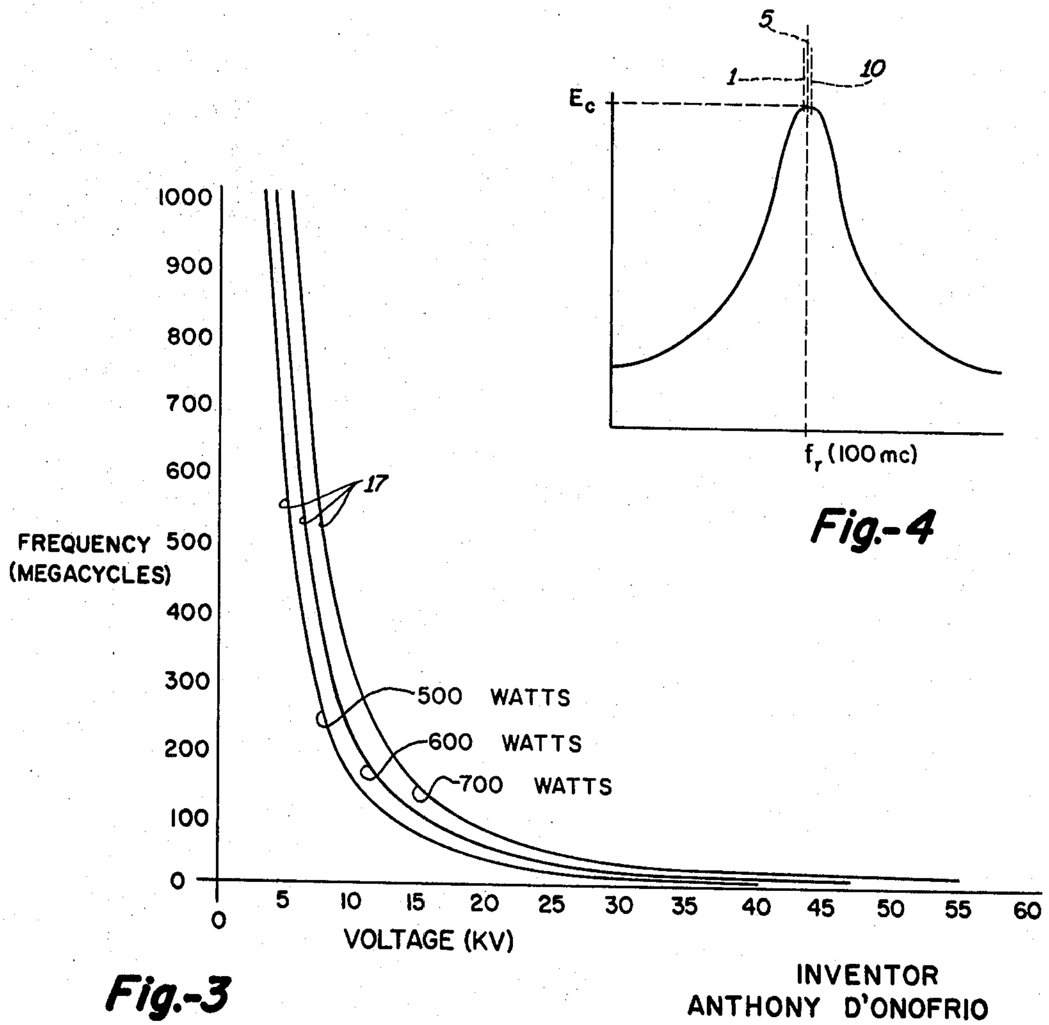
FIGURE 3 shows several constant power curves.
FIGURE 4 shows a resonance curve showing voltage changes with frequency.

From Equation 6 it is to be noted that the power dissipated is a function of voltage and frequency. Thus the higher the oscillator frequency the lower the voltage required. The voltage-frequency relationships for constant power curves 17 is shown in the graph of voltage vs. frequency of FIGURE 3. As a practical matter, the dielectric strength of the materials determines the maximum voltage and consequently the frequency. Hence the voltage chosen should not exceed the dielectric strength of the dielectric materials to be heated.

Knowing the power dissipation required and with the limitation that the voltage across the dielectric material should not exceed its dielectric strength, any combination of voltage and frequency may be chosen which intersect (FIGURE 3) a constant power curve 17 corresponding to the power required.

In the circuit of FIGURE 1, for reasons which will hereinafter appear, L is adjusted so that with the value of $C_s + C_p$, the latter corresponding to the largest character pattern area or larger, and to a thickness of dielectric material between plates intermediate a maximum and minimum thickness, the series LC circuit is resonant at the oscillator frequency. For example, if up to 10 sheets of dielectric material are to be marked the circuit will be resonant when 5 sheets are between plates 12 and 13. At resonance the voltage $E_c$ across the capacitor is a multiple of the oscillator output voltage E, i.e.

$$E_c=EQ \text{ where } Q=\frac{X_c}{R}=\frac{1}{\omega R(C_s+C_p)} \qquad (7)$$

Accordingly the output voltage of the oscillator need only be such that EQ is the voltage necessary to dissipate the power required to raise the temperature $\Delta T$ of 5 sheets of dielectric material in the chosen time.

The reasons for resonating the circuit of FIGURE 1 when the dielectric thickness determining $C_p$ is the median thickness to be marked, is to maintain $E_c$ substantially constant with changes in $C_p$ due to changes in area or dielectric thickness from the median value. That $E_c$ will not change substantially with changes in $C_p$ will be appreciated from the fact that the resonant frequency is determined by $C_s$ and $C_p$, and since $C_s$ is so much larger than $C_p$, the circuit is not appreciably detuned to either side of resonance as $C_p$ changes due to changes in dielectric thickness to either side of the median. More particularly, using the average area (.005 sq. in.) of 10 pitch type and paper sheets with thermosensitive coatings having thicknesses of .002" and a dielectric constant of 3, the capacitance $C_p$ ($C_p=KAe/d$ where $K=.225$) for 1, 5, and 10 sheets was determined to 1.69 micromicrofarad, .338 micromicrofarad and .169 micromicrofarad. With the circuit resonant at 100 megacycles the total load capacitance including stray capacitance $C_s$ is on the order of 50 micromicrofarads and the change in frequency and consequently $E_c$, FIGURE 4, due to changes in $C_p$ corresponding to 1 and 10 sheets are negligible. Considering Equation 6 $E_c$ may therefore be considered to be constant. Accordingly the only variable in power dissipation is due to changes in $C_p$ as a result of area or thickness changes; power dissipation varying directly with character pattern area and inversely with thickness of material between plates to be marked.

Considering that the weight of the material to be marked and accordingly the energy required also varies directly with character pattern area, it is evident that any changes in character pattern area, as for example from an M pattern to a period pattern, reduces the energy required and the power dissipated as well. Accordingly, the circuit automatically compensates for changes in character pattern area as is evident from Equation 6.

On the other hand in that energy requirement varies directly with thickness and power dissipation inversely with thickness, a decrease in sheet thickness from 5 sheets reduces the energy required and increases the power dissipated; and an increase in sheet thickness above 5 sheets increases the energy required and decreases the power dissipated. Accordingly when the thickness decreases the time of application of power is reduced and when the thickness increases the time $t$ is increased. The time interval $t$ is varied as will hereinafter appear by adjusting the pulse width of a one shot multivibrator.

While it is preferable to vary time to accommodate varying dielectric thicknesses as noted above, where the load circuit is made resonant at the value of $C_p$ corresponding to maximum thickness to be marked in a unit time, changes in thickness from the maximum may be accommodated by detuning the load circuit to reduce the power dissipated. Further these adjustments of time or load inductance may be automated in response to the distance separating the paper bails as variable sheet thicknesses are placed in the machine.

The thickness of the character pattern is not critical and need only exceed a minimum thickness on the order of .002–.005". As will be appreciated, when the character pattern is conductive the major portion of the electric flux will be confined to the path 18 (FIGURE 1) between the character pattern and the viewing plate inasmuch as the character pattern is closer to the viewing plate. In effect then the conductive character pattern directs or channels the electric field drawing equipotential planes closer together through the dielectric material whereby the potential gradient across the dielectric material between character pattern and viewing plate becomes much higher per unit thickness and sufficient to heat the dielectric material to effect a visible change or mark. In other words the character pattern provides a preferential path for the electric field through discrete cross sections of the dielectric material whose area configuration is that of the character pattern. This effect is more pronounced with increasing character pattern thickness.

When the character pattern is a dielectric material, its thickness should be such that the voltage dropped in the air gap 19 between plates but outside the character pattern will leave the voltage dropped across the dielectric sheets in the air gap paths insufficient to raise the temperature the required amount, i.e., the potential gradient across the dielectric material in the air gap path will be too low to effect a visible change or mark. As is evident the voltage across a dielectric=

$$IX_c=\frac{I}{\omega C}=\frac{I}{\frac{\omega Ae}{d}}$$

or $$E=\frac{K}{e} \text{ where } K=\frac{I}{\frac{\omega A}{d}} \qquad (7)$$

i.e. the voltage is inversely proportional to the dielectric constant. Accordingly, in a path including air and paper, since the dielectric constant of paper is on the order of 3 times the dielectric constant of air, the voltage drop across the air will be three times as great for the same thickness. Hence the thickness of the air gap 19 as determined by the thickness of the dielectric character pattern, must be such that the voltage not dropped thereacross is insufficient to raise the temperature of the paper in the air gap paths sufficiently to mark.

Figure 5:
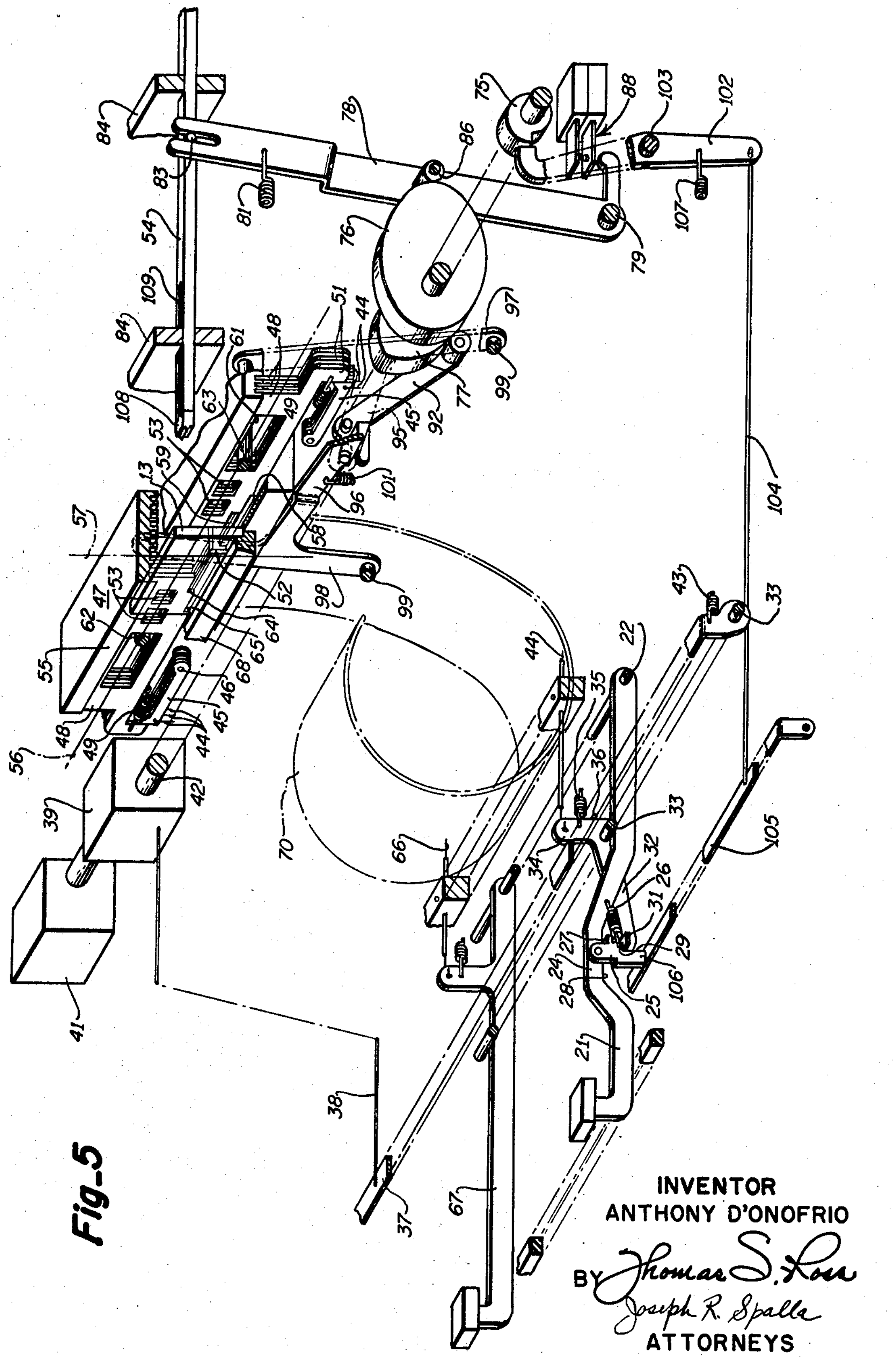
FIGURE 5 is a perspective view of a typewriter embodying the invention.
Figure 6:
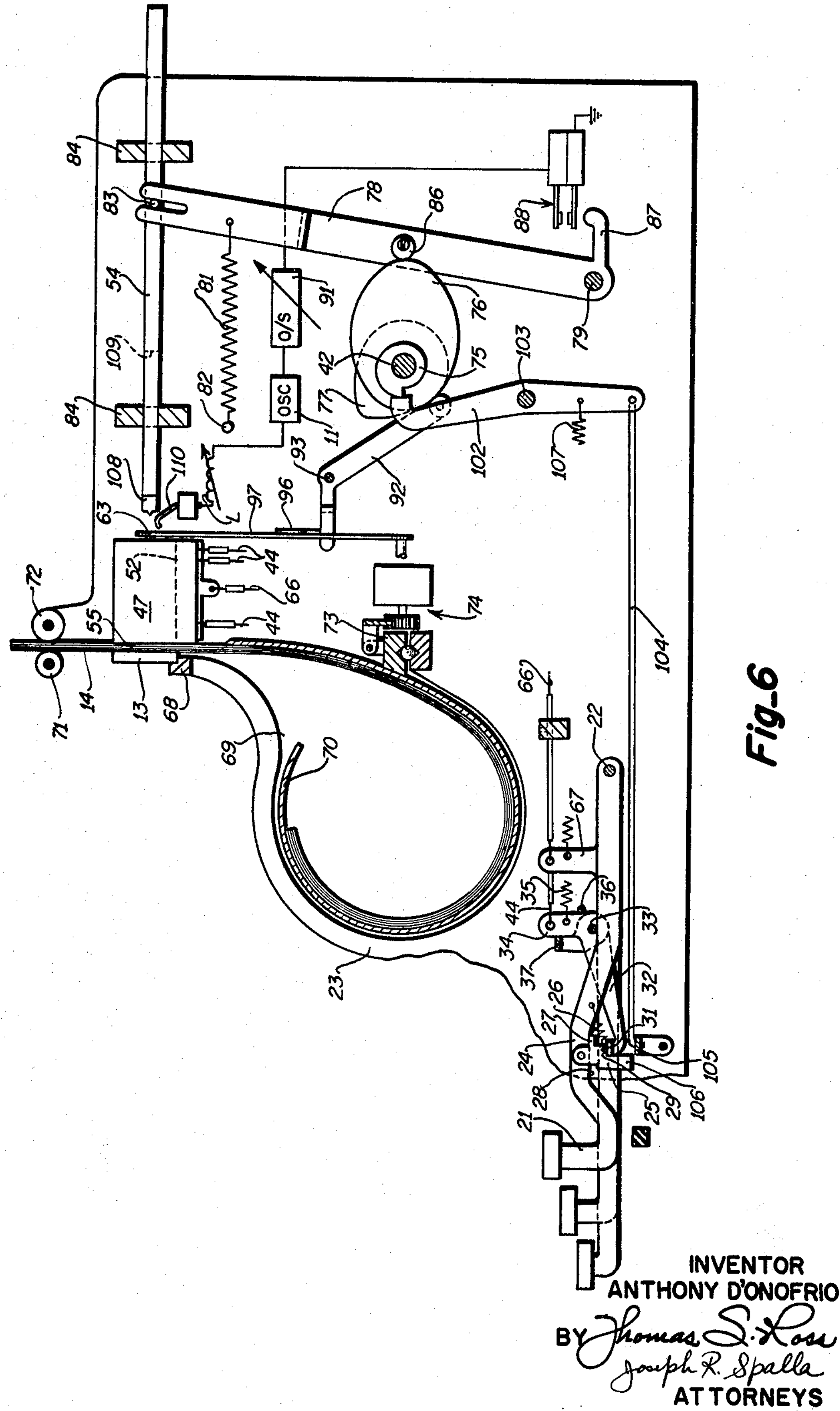
FIGURE 6 is a cross sectional view of the typewriter shown in FIIGURE 5.

Referring now to FIGURES 5 and 6 there is illustrated a machine organization embodying the principle of the invention. Broadly the machine comprises a keyboard, manually or automatically controlled by prerecorded tapes, for cycling the machine whereby a character plate is selected and positioned at the printing station, the character plate is connected in circuit with the high frequency power oscillator 11 and the oscillator is activated over a pulse interval $t$. More particularly the keyboard comprises a plurality of key levers 21, only one of whose associated actions is shown, representing characters to be typed. Each key lever extends toward the rear of the machine and is fulcrumed at its end to a cross shaft 22 secured in the side plates 23 of the machine frame.

The key lever 21 is shaped to provide a raised horizontal section 24 in the plane of the key lever and intermediate its ends. A depending flipper 25 pivotally secured at its uppermost end to the raised section of the key lever is biased counterclockwise as viewed in FIGURE 5 by a spring 26 secured to the flipper below its pivot and to the downwardly inclined portion of the key lever rearwardly of the raised horizontal section. The dependent flipper is provided with a rearwardly disposed bent off ear 27 which engages the bottom edge 28 of the raised horizontal section thereby to maintain the flipper in a vertically dependent position. The lower portion of the flipper body is forwardly offset thereby forming a downwardly facing shoulder 29 adapted to engage a shelf 31 on the forwardly disposed end of a sublever 32. The sublever extends rearwardly and upwardly from the shelf and is fulcrumed on a cross shaft 33 secured to the machine frame whereby when the key lever 21 is depressed its flipper 25 acts on shelf 31 to rotate the sublever 32 counterclockwise and thereby effect the forward movement of the upwardly extending portion 34 of the sublever against the force of its associated return spring 35. A common bail 36 secured rearwardly of the upwardly extending portions of the sublevers serves to limit the clockwise movement thereof.

A trigger bail 37 is pivotally mounted at its ends on the sublever fulcrum shaft 33 and extends across the machine forwardly of the upwardly extending portions 34 of the sublevers so as to be operable counterclockwise by any actuated sublever. The trigger bail is connected by a rearwardly extending link 38 to the engagement actuator of a one revolution clutch 39 thereby to couple a motor 41 to a cam shaft 42. The trigger bail is biased rearwardly as by springs 43, only one of which is shown, against the upwardly extending portions 34 of the sublevers.

The uppermost end of each sublever has connected thereto one end of a Bowden wire 44 whose other end is connected to a latch member 45 pivotally mounted on a shaft 46 supported by a slide housing generally designated by reference numeral 47. Each latch member is associated with a slide 48 mounted in the housing whereby upon actuation of a sublever an associated Bowden wire 44 will pull its latch member 45 thereby releasing a slide 48 toward the machine center defined by a center stop 52. The above mechanism is similar to that disclosed in U.S. Patent 3,157,264.

Each slide 48 as viewed in FIGURE 5 is substantially rectangular and is provided adjacent the end facing the machine center with two side by side openings 53, preferably square, dimensioned to hold and retain therein upper and lower case character plates 12 and dimensioned to permit passage of a striking rod 54 whereby the latter, when operated forwardly will pass through a positioned slide opening, picking up and carrying the character plate 12 therein adjacent the rearwardmost sheet of paper positioned between the viewing plate 13 and the front surface 55 of the slide housing 47. When a character plate 12 is so positioned a potential will be applied across plates 12 and 13 as will hereinafter appear.

In accordance with the embodiment of the invention illustrated, one slide 48 is provided for each key lever and each is released to position a character plate 12 carried therein by an action similar to that above described. As seen in FIGURE 5, provision is made for mounting a sufficient number of slides 48 to accommodate a full keyboard of alpha and numeric characters in the housing 47. The housing as viewed in FIGURE 5 has a hollow rectangular shape which is preferably of plastic material having a low coefficient of friction and secured in any suitable manner to the machine frame. The housing 47 is secured to the rear of the writing line 56 and centrally of the machine, i.e. centrally of a vertical line 57 through the printing station of the machine, and is formed with a plurality of parallel vertical channels 58 extending laterally to either side of the machine center line 57 thereby to accommodate half of the slides to one side and the other half of the slides to the other side of center line 57. The channels 58 are defined by short ribs 59 formed interiorly of the hollow housing thereby to provide access through the housing for the stroking rod 54 whose center is aligned with the intersection of lines 56 and 57.

The slides 48 are further provided with rectangular openings 61 adjacent their outwardly facing ends which are adapted to receive simultaneously operable reset bails 62 and 63 associated with the slides on either side of center line 57 respectively.

Also as seen in FIGURE 5 the bottom edge adjacent the inwardly facing end of each slide is provided with staggered cutouts forming shoulders 64 and 65 each of which is on a vertical line bisecting the square openings 53 and which shoulders are adapted to cooperate with the center stop 52 which is normally positioned to intercept shoulder 64 to permit positioning of lower case type and retractable by a Bowden wire 66 connected to a shift key 67 so as to intercept shoulder 65 and thereby permit positioning of upper case characters.

In accordance with the invention the slides 48 are preferably of light weight plastic material such that they may be considered low inertia elements which when encountering the center stop 52 will experience negligible bounce so as to be stationary when the stroking rod 54 enters the slide housing.

As shown in FIGURE 6 the viewing plate 13 is secured to a cross bar 68 whose ends are secured to the machine side frames 23. The side frames 23 as viewed in FIGURE 6 are provided with openings 69 to accommodate movement of a paper trough generally designated by reference 70 and having a width to accommodate the largest paper widths.

The dielectric sheets 14 of material to be marked may be inserted between opened feed rollers 71 and 72 and pushed down between the viewing plate 13 and the surface 55 of the slide housing into the trough 70. Thereafter the feed rollers, which may be of the friction or pin feed type, may be closed. The feed rollers 71–72 and paper trough 70 may be mounted on any suitable carriage 73 provided with a conventional escapement 74 whereby after marking the sheets 14 may be indexed in letter space and carriage return direction. Further, the rearwardmost feed roller 72 may be clutched to a motor source to effect line space indexing of the sheets in response to a line space command key or may be manually indexed in any conventional manner. As hereinbefore noted the frame supported viewing plate 13 is preferably made of glass having a conductive coating on its rear side to permit viewing the composed characters as they are written from the front of the machine.

Figure 9:
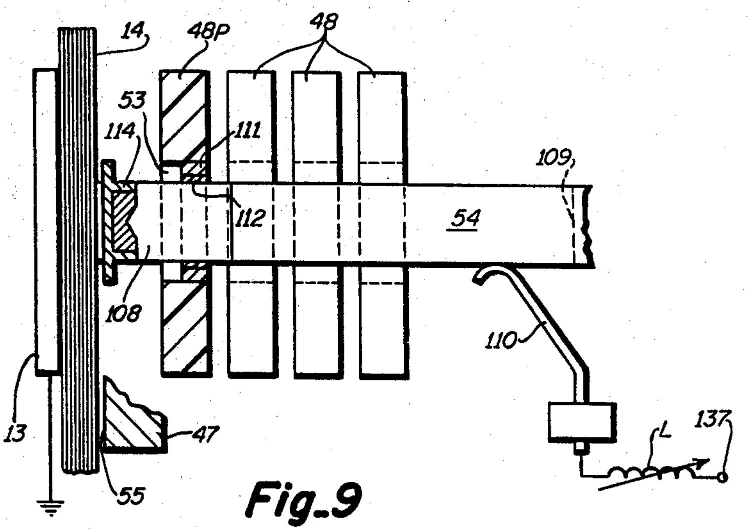
FIGURE 9 is a view similar to FIGURE 8 showing a character plate positioned at the printing station by the stroking rod.

The cam shaft 42 which makes one revolution in response to operation of any key as hereinbefore noted carries a stepped by-pass cam 75, a stroking rod control cam 76, and a slide reset cam 77. Associated with the stroking rod control cam is a follower arm 78 fulcrumed on a frame supported shaft 79 and which extends upwardly therefrom. The arm 78 is biased forwardly toward the cam by a spring 81 secured thereto and to a frame supported shaft 82. The uppermost end of the follower arm is forked to effect its operative connection with a pin 83 extending from the side of the stroking rod. As shown in FIGURES 5 and 6 the stroking rod is supported and guided for forward movement by passages in frame supported members 84. Accordingly, as the shaft 42 is cycled and the control cam 76 turns clockwise the stroking rod will move forwardly to writing position (FIGURE 9) only as permitted by the control cam. As viewed in FIGURE 6 the control cam surface is provided with a dwell such that the stroking rod 54 will be stationary over a predetermined interval at printing position (FIGURE 9). It will be appreciated that as the number of sheets 14 of dielectric to be marked varies so too the stroke of the rod must vary. To this end the follower arm is provided with an eccentric 86 which contacts the cam whereby adjustment of the eccentric will control the stroke of the rod. The cam follower 78 is further provided with an arm 87 adjacent its pivot which is adapted to close contacts 88 located in proximity thereto. The contacts are so positioned relative to the arm that they close when the rod has moved to the FIGURE 9 printing position. The closure of the contacts triggers a one shot multivibrator 91 which initiates oscillations of the oscillator 11 over the one shot interval $t$ whereby power is applied across the character and viewing plates.

The reset cam 77 is similarly associated with a cam follower 92 fulcrumed on the machine frame as at 93. Cam follower 92 is adapted when rotated clockwise about its pivot to act upon inwardly directed arms 95 and 96 extending orthogonally from reset bail actuating levers 97 and 98 which are fulcrumed on associated shafts 99 and biased as by a spring 101 to the rest positions shown thereby to permit unimpeded movement of selected slides 48; spring 101 also serving to bias follower 92 against its cam 77. The ends of arms 95 and 96 are connected as by a pin and slot connection so that both may be simultaneously actuated by the cam follower 92 and thereby effect the outward movement of slide reset bails 62 and 63.

The stepped by-pass cam 75 is similarly associated with a cam follower 102 fulcrumed as at 103 and connected by a link 104 to a by-pass bail 105 positioned rearwardly of the depending tails 106 of the flippers 25. The by-pass follower is biased by a spring 107 against its cam and is operable to move the bail forward to forwardly deflect the flippers 25 away from shelves 31 should the key lever 21 remain depressed overlong or after a type action, thereby to repeat actions.

Figure 8:
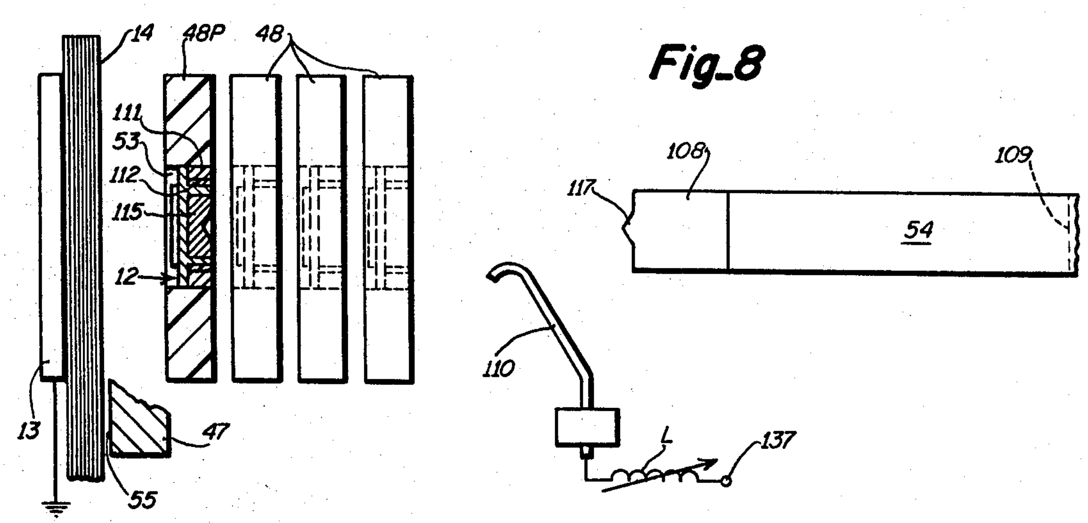
FIGURE 8 is an enlarged cross sectional view of the printing point elements showing one of the character slides positioned with a character plate in the path of the character positioning rod.

As viewed in FIGURES 5 and 8, the forwardmost end of a stroking rod supports a permanent magnet 108 having a tongue 109 integral therewith which extends rearwardly. Positioned in the path of the rod is a wiping contact 110 connected in circuit with the high side of the oscillator 11. Accordingly as the rod moves forwardly it is conductively connected in circuit with the oscillator and when the rod reaches its final forward position, FIGURE 9, contacts 88 will have closed to thereby pulse the oscillator as will hereinafter appear.

When the rod or selected character is in printing position (FIGURE 9) it need only contact the dielectric material with sufficient pressure as to minimize any air gap between sheets or plates in the character paths for reasons hereinbefore explained.

Figure 7:
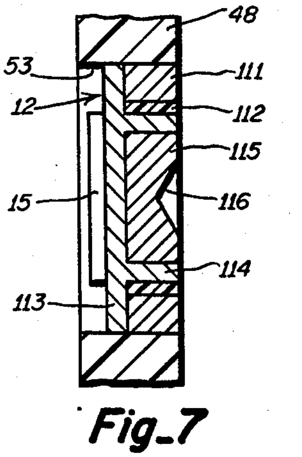
FIGURE 7 is an enlarged partial sectional view showing character plate and slide mount details.

With reference to FIGURE 7 a frame 111 of permanently magentized material is set into each slide opening and preferably recessed from the forward side of the slides. The frame of magnetized material may take the form of bar magnets suitably secured within the slide openings as by embedding or by suitable adhesives. The inner wall of the frame magnet is preferably coated with an insulating material 112 to prevent arcing between the frame and the permanent magnet material of the rod 54 when the oscillator is pulsed.

The character plates 12 are magnetically releasably retained in the opening of the slides as shown in FIGURE 7. More particularly the character plates comprise a flat portion having the dimension of the slide opening provided on its front face with a conductive character pattern 15. Extending rearwardly from the flat portion of the character plate is a skirt dimensioned to be received within the coated magnet frame 111. The skirt 114 retains a slug 115 of magnetic material whereby the character plate is retained in the slide opening by the magnetic attraction between the frame magnet 111 and slug 115. As viewed in FIGURES 7–9 the rearwardly facing side of the slugs are provided with depressions 116 and the terminal part of the stroking rod is provided with a complementary projection 117 thereby to assure registry of the rod and character plate.

The character pattern may also be coated with a lossy material for reasons hereinbefore noted rather than provide a separate lossy sheet with the paper pack.

As is apparent from the above when a slide 48P is positioned and the rod encounters a character plate 12 in the positioned slide, the character plate is magnetically retained by the force of attraction between the character plate slug 115 and the permanent magnet 108 on the rod 54 as the character plate is moved from its slide. Also as will be appreciated the stroking rod and character plate will be conductively connected. After a character has been printed the return movement of the rod by the control cam 76 back through the positioned slide will redeposit the character plate in the slide opening; the frame magnet stripping the character plate from the rod as the latter is withdrawn.

Figure 10:
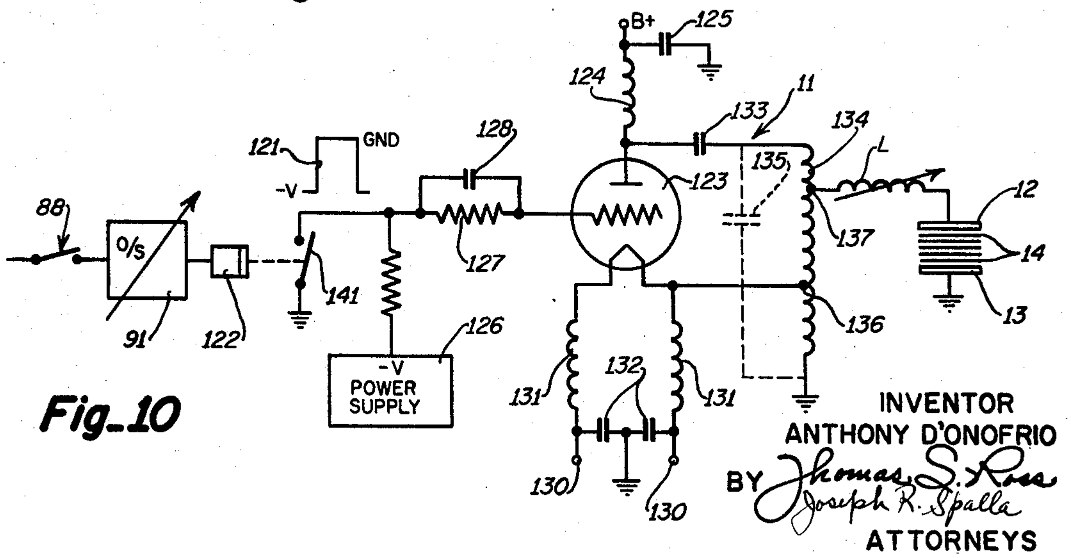
FIGURE 10 is a block schematic diagram of the electrical components of the invention.

The electronic circuit shown in FIGURE 10, comprises as noted hereinbefore, a pulser in the form of an adjustable one shot multivibrator which generates a pulse, having a width corresponding to the time $t$, Equation 6, necessary to raise the temperature $\Delta T$ of the number of sheets in the machine, in response to closure of switch contacts 88. The multivibrator is adjustable to generate pulses of lesser or greater width when the number of sheets varies from a median number, e.g. 5, as hereinbefore noted. Further the time interval of the pulse may be further increased beyond that necessary to mark thereby to broaden or emphasize the recorded mark, when desired, to simulate bold type. As more particularly shown in FIGURE 7 when the multivibrator is triggered an electromagnet 122 is energized over its active interval thereby to ground the grid of the oscillator tube over the interval $t$.

As hereinbefore noted the oscillator is designed with circuit elements to generate sufficient power at a particular voltage and frequency such that the energy required will be dissipated in a time interval $t$. The oscillator may comprise a triode tube having its plate connected to a source of B+, e.g. 2.5 kv., through a high frequency choke coil 124 provided with a by-pass capacitor 125. The grid of the tube is normally connected to negative voltage supply 126 via a grid leak bias arrangement comprising resistor 127 and capacitor 128 whereby the oscillator will be self-starting when the grid assumes ground potential. The directly heated cathode is connected to terminals 130 of a source of filament power via radio frequency chokes 131 bypassed to ground.

The plate of the triode also is connected via a coupling capacitor 133 to one end of a coil 134 which together with a capacitance 135 representing the plate to cathode interelectrode capacitance and the distributed capacitance between coil turns comprises the tank circuit of the oscillator. The cathode is also connected to a tap 136 on the coil to apply between cathode and grid a voltage 180° out of phase with respect to the voltage between plate and cathode to sustain oscillation. As will be apparent the above circuit is modified form of Hartley oscillator.

The load circuit is made resonant at the chosen frequency of the oscillator and connected to a tap on the coil of the oscillator tank circuit such that the power transferred to the load is optimized and is sufficient to dissipate at the printing point the energy required. As hereinbefore explained the load is resonant when a median number of sheets e.g. 5 are to be marked. When the one shot 91 is triggered and its output energizes the electromagnet 122 the latter closes a switch 141 to ground the grid of the oscillator over the multivigrator period.

In operation, with dielectric record material 14 in the machine e.g. 5 sheets, the depression of a key lever 21 will release a slide 48P whose spring 49 will drive it to the center stop 52 whereby the upper or lower case opening 53 as the case may be, will be positioned directly in the path of the stroking rod. In FIGURE 8 slide 48P is shown positioned. Simultaneously the movement of the sublever 32 associated with the slected key will rock the trigger bail 37 and thereby through link 38 effect the actuation of the one revolution clutch thereby connecting the motor source to the cam shaft 42. As the cam shaft revolves through 180° the control cam will permit spring 81 to urge the follower and rod 54 through the positioned slide opening 53 whereby the character plate 12 releasably retained therein will be picked up and carried to the writing position of the slide housing 47. When a character plate 12 is so positioned a potential will be applied across plates 12 and 13 as will hereinafter appear.

As the stroking rod moves toward printing position it will be connected in the oscillator circuit as by contact with the wiping contact 110. Accordingly, the character plate 12 when positioned as shown in FIGURE 9 will be magnetically and conductively connected to the stroking rod 54. When the rod and selected character plate are so positioned adjacent the rearwardmost sheet of dielectric material 14 the cam follower arm 78 will effect closure of contacts 88 triggering the one shot multivibrator 91 which will ground the grid of the oscillator tube to initiate oscillation over the multivibrator period (less than the dwell time of the cam). Thus the series load circuit, the latter including the printing point capacitance $C_p$ determined by the dielectric 14 between character and viewing plate will be connected across the voltage developed between tap 137 and ground; the power dissipated in the capacitor $C_p$ over the interval $t$ generating the heat within the dielectric to raise it to marking temperature.

Subsequent to marking the stroking rod will be returned by the follower arm urged by the control cam, and during its return through the selected slide will redeposit the character plate in its slide opening wherein it will be magnetically retained until again slected. After the rod has moved sufficiently to clear the rear of the housing the reset cam is effective through its follower to return and latch the selected slide. The by-pass cam follower is immediately operable to rock bail 105 so that if a key is depressed overlong a repeat action will be provented as will depression of any other key.

Where a lesser or a greater number of sheets than 5 are to be marked, e.g. 1 or 10, the pulse period will be decreased and increased respectively as hereinbefore noted to maintain equality between power required and dissipated.

Upper case printing is effected by depressing the shift key lever 67 which moves the center stop 52 as hereinbefore explained whereby it will intercept the upper case shoulder 65 to position an upper case opening directly in front of the rod.

The use of a resonant load circuit disclosed facilitates impedance matching and maximum power transfer. It also permits use of an oscillator having relatively low plate voltage requirements. However it is to be understood that any type of load coupling to deliver sufficient power to the printing point capacitor may be employed, including incorporation of the printing point capacitance in the oscillator tank circuit. Further, any type of oscillator including shock excited oscillators which can generate the required power is within the invention.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A method for recording character patterns comprising supporting polar dielectric sheet material which visibly changes when heated to a predetermined recording temperature within the electric field established between spaced conductors, establishing an electric field by applying for a predetermined time an alternating voltage across said spaced conductors of a magnitude and frequency sufficient to supply the power necessary to dielectrically heat and visibly change in said predetermined time discrete cross sections only of said sheet material whose area in the plane of the material conforms to that of a selected character pattern to be recorded, and selectively channelling the electric field established by said applied voltage between said conductors through discrete cross sections of said material whose area configuration in the plane of said sheet material is less than the planar area of sheet material between said conductors and conforms to that of a selected character pattern, so that the potential gradient across said discrete sections only is sufficient to effect the power dissipation in the form of heat necessary to dielectrically heat said discrete sections of said material to recording temperature in said predetermined time.

2. A method as recited in claim 1 wherein said sheet material includes at least one sheet of paper.

3. A method as recited in claim 1 wherein said sheet material includes at least one sheet of paper having a thermally sensitive coating thereon which visibly changes in response to the heat locally generated within said paper by the channelled field.

4. A method as recited in claim 1 wherein said sheet material includes at least one carrier sheet having a thermally sensitive coating thereon which visibly changes in response to heat locally generated therein by said channelled field.

5. A method for recording character patterns comprising supporting polar dielectric sheet material which visibly changes color when heated to a predetermined recording temperature between a first and a second conductive plate, applying for a predetermined time an alternating voltage of a predetermined magnitude and frequency across said plates, and providing preferential paths for the electric field set up by said applied voltage through discrete cross sections of said material whose area configuration in the plane of said sheet material is less than the planar area of sheet material between said plates and conforms to that of a selected character pattern such that the potential gradient across said discrete sections only is sufficient to effect the dissipation of power necessary to dielectrically heat said discrete sections to recording temperature in said predetermined time.

6. A method for recording character patterns comprising the steps of, supporting polar dielectric sheet material which visibly changes color when heated to a predetermined recording temperature between a first and a second conductive plate, establishing between said plates for a predetermined time an alternating electric field of a predetermined magnitude and frequency, and selectively channelling said field through discrete cross sections of said sheet material whose area configuration in the plane of said sheet material is less than the planar area of sheet material between said plates and conforms to that of a selected character pattern to provide a potential gradient across said discrete sections sufficient in said predetermined time to dielectrically heat said discrete sections only to recording temperature.

7. A method of recording character patterns, comprising supporting a polar dielectric sheet material within an electric field established between a first and a second spaced conductor, establishing said electric field by applying an alternating voltage of predetermined magnitude and frequency across said conductors for a predetermined time, and providing preferential paths for the electric field set up by said applied voltage through discrete cross sections of said sheet material whose area in the plane of said sheet is less than the planar area of sheet material between said conductors and conforms to a selected character pattern to be recorded to provide a potential gradient across said discrete sections sufficient to effect the dissipation of power necessary to dielectrically heat said discrete sections to a recording temperature in said predetermined time.

8. Apparatus for visibly recording graphic patterns in polar dielectric record material comprising spaced conductive elements adapted to support said record material, a normally quiescent oscillator having its output connected to said spaced elements for setting up between said elements and through said record material supported thereby an alternating electric field of predetermined intensity and frequency, means for pulsing said oscillator over a predetermined interval, and means defining a selected graphic pattern located within and operative to confine the passage of said electric field across discrete cross sections of said record material whose area configuration in the plane of said material is that of said graphic pattern, whereby the potential gradient only across said discrete sections of said material through which the confined field passes will be sufficient to effect the dissipation over said predetermined interval of the power required to heat and visibly mark said record material.

9. Apparatus as recited in claim 8 wherein said spaced conductive elements comprise a first plate and a second plate, and wherein said graphic pattern defining means is coupled to one of said plates.

10. Apparatus as recited in claim 9 wherein said graphic pattern defining means is conductive material attached to said one plate.

11. Apparatus as recited in claim 9 wherein said other of said plates is a transparent conductive material.

12. Apparatus for dielectrically heating and visibly marking polar dielectric record material in accordance with defined character patterns comprising a first plate, a second plate, said first and second plates being spaced to accommodate record material therebetween and defining therewith a load, a high frequency power oscillator adapted to generate across said load the power required to heat and visibly mark discrete sections only of said record material whose area configuration in the plane of said material is that of a selected character pattern to be marked, means for pulsing said oscillator over a predetermined interval, and a conductive character pattern connected to one of said plates for confining the electric field between plates across discrete sections of said record material whose area in the plane of said record material is that of the character pattern whereby the potential gradient across said discrete sections only of said record material through which said field is confined will dissipate over said predetermined interval the power required to heat and visibly mark said record material.

13. Apparatus for recording character patterns in polar dielectric sheet material which visibly changes color when heated to a predetermined recording temperature comprising, spaced conductors for supporting said sheet material, an oscillator connected to and adapted when excited to apply an alternating voltage across said spaced conductors whose magnitude and frequency is sufficient over a predetermined time interval to supply the power necessary to dielectrically heat to recording temperature discrete cross sections only of said sheet material whose area configuration in the plane of said sheet material is that of selected character patterns to be recorded, means for channelling the electric field established between said conductors by said applied voltage through selected discrete cross sections of said sheet material whose area configuration in the plane of said sheet material is that of a selected character pattern such that the potential gradient only across said selected discrete sections is sufficient to effect the dissipation of power necessary to dielectrically heat said sections to recording temperature in said predetermined time interval, and means for exciting said oscillator for said predetermined time interval whereby the power dissipated will dielectrically heat said selected discrete sections to recording temperature.

14. Apparatus for recording character patterns in polar dielectric sheet material which visibly changes color when heated to a predetermined recording temperature, comprising spaced conductive plates for supporting said sheet material therebetween, means defining a selected character pattern located between said spaced plates for directing an alternating electric field through selected discrete cross sections of said sheet material whose area configuration in the plane of said sheet is less than the planar area of said plates and is that of said selected character pattern, an oscillator connected to said spaced plates and adapted when excited to generate a voltage whose magnitude and frequency establishes an electric field whose potential gradient across said selected discrete sections is sufficient over a predetermined time interval to dielectrically heat said selected discrete sections only to recording temperature, and means for exciting said oscillator over said predetermined time interval.

15. In a writing machine having in combination means for supporting polar dielectric record material for movement relative to a printing point, a plurality of character plates bearing character patterns whose area configuration is less than the planar area of said plates, means for selectively positioning said character plates at said printing point on one side of said record material, a common plate on the other side of said record material defining said printing point, an oscillator for applying when energized an alternating voltage of predetermined magnitude and frequency across said common and a positioned character plate, and means energizing said oscillator over a predetermined interval whereby said character pattern on a positioned plate establishes an electric field through discrete cross sections of said record material such that the power dissipated in the form of heat visibly marks only the discrete cross sections of the record material between said character pattern and said common plate.

16. In a writing machine having in combination means for moving at least one sheet of polar dielectric material relative to a printing point, a common plate defining said printing point, a plurality of slides, character plates retained in said slides bearing character patterns whose area configuration is less than the planar area of said plates, means for selectively positioning said slides to bring a character plate opposite and with the character pattern thereon facing said common plate, said sheet material being located between said common and positioned character plate, means operable to move a character plate in the positioned slide adjacent the sheet material, a high frequency oscillator, first means responsive to the movement of said character plate for connecting said oscillator output across said common and positioned character plate, and second means responsive to the movement of said character plate operative to pulse said oscillator over a predetermined time interval sufficient to permit the electric field established across said common and positioned charatcer plate to dissipate the power necessary to heat and visibly mark discrete sections only of said material therebetween whose area configuration in the plane of said material is that of the character pattern on the positioned character plate.

17. Apparatus as recited in claim 16 wherein said second means comprises a switch and an adjustable one shot multivibrator triggered in response to operation of said switch by said character plate moving means.

References Cited

UNITED STATES PATENTS

| | | | |
|---|---|---|---|
| 2,650,291 | 8/1953 | Kinn | 101—416.1 X |
| 2,676,416 | 4/1954 | Calosi et al. | 101—461 X |
| 2,873,345 | 2/1959 | Gard | 101—416.1 X |
| 3,008,066 | 11/1961 | Newberry | 313—89 X |
| 3,137,003 | 6/1964 | Anderson et al. | 340—173 X |
| 3,137,841 | 6/1964 | Ryder | 340—173 |
| 3,144,650 | 8/1964 | Levine | 340—173 X |
| 3,152,321 | 10/1964 | Peltzer | 340—173 |
| 3,157,264 | 11/1964 | Frechette | 197—6.7 X |
| 3,175,196 | 3/1965 | Lee et al. | 346—76 X |
| 3,243,784 | 3/1966 | Anderson et al. | 340—173 |
| 3,299,809 | 1/1967 | Javorik et al. | 101—426 |

ROBERT E. PULFERY, *Primary Examiner.*

E. S. BURR, *Examiner.*